Feb. 18, 1930.  H. E. BIRKHOLZ  1,747,694
AIR FILTER
Filed March 30, 1925   3 Sheets-Sheet 1
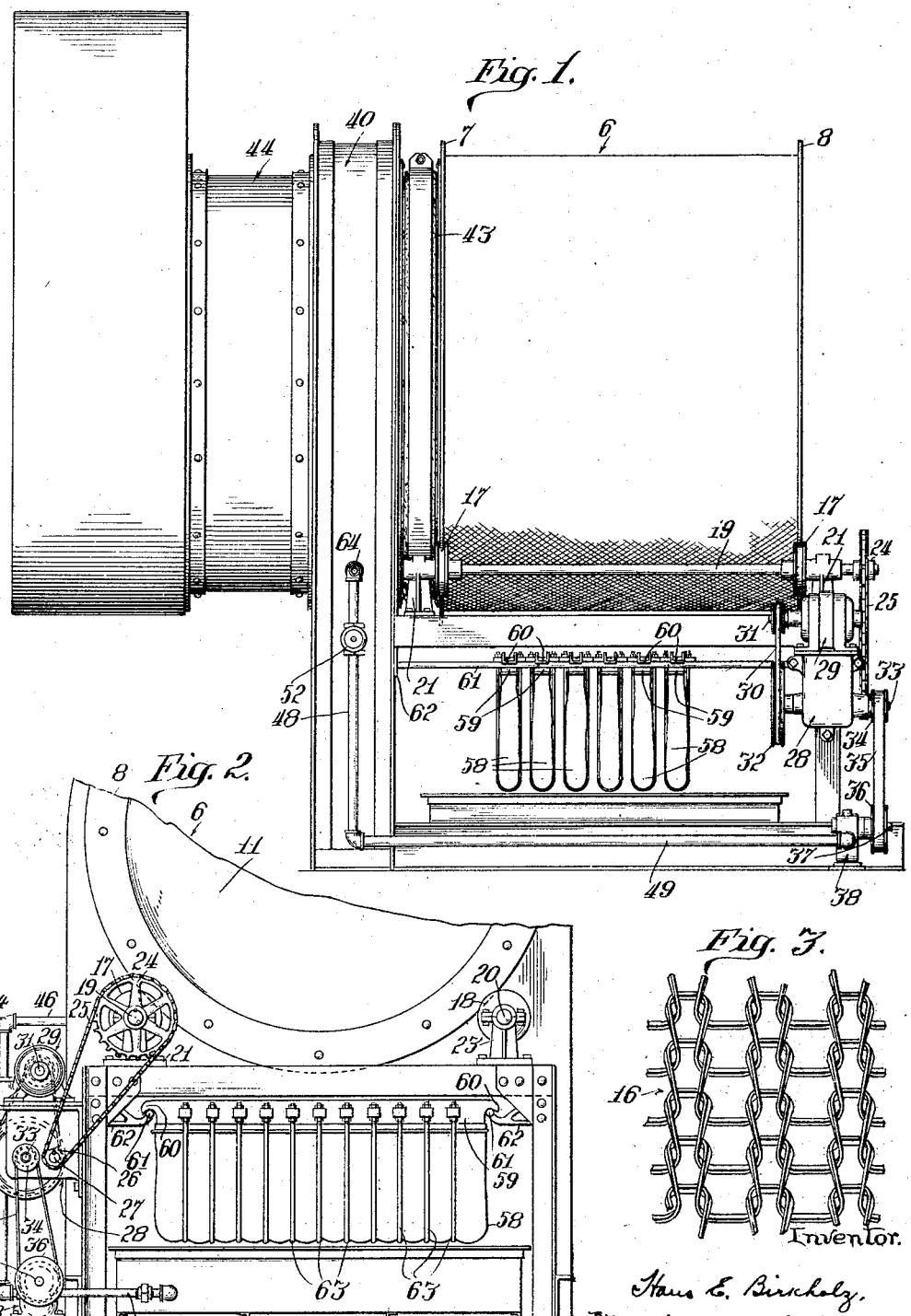

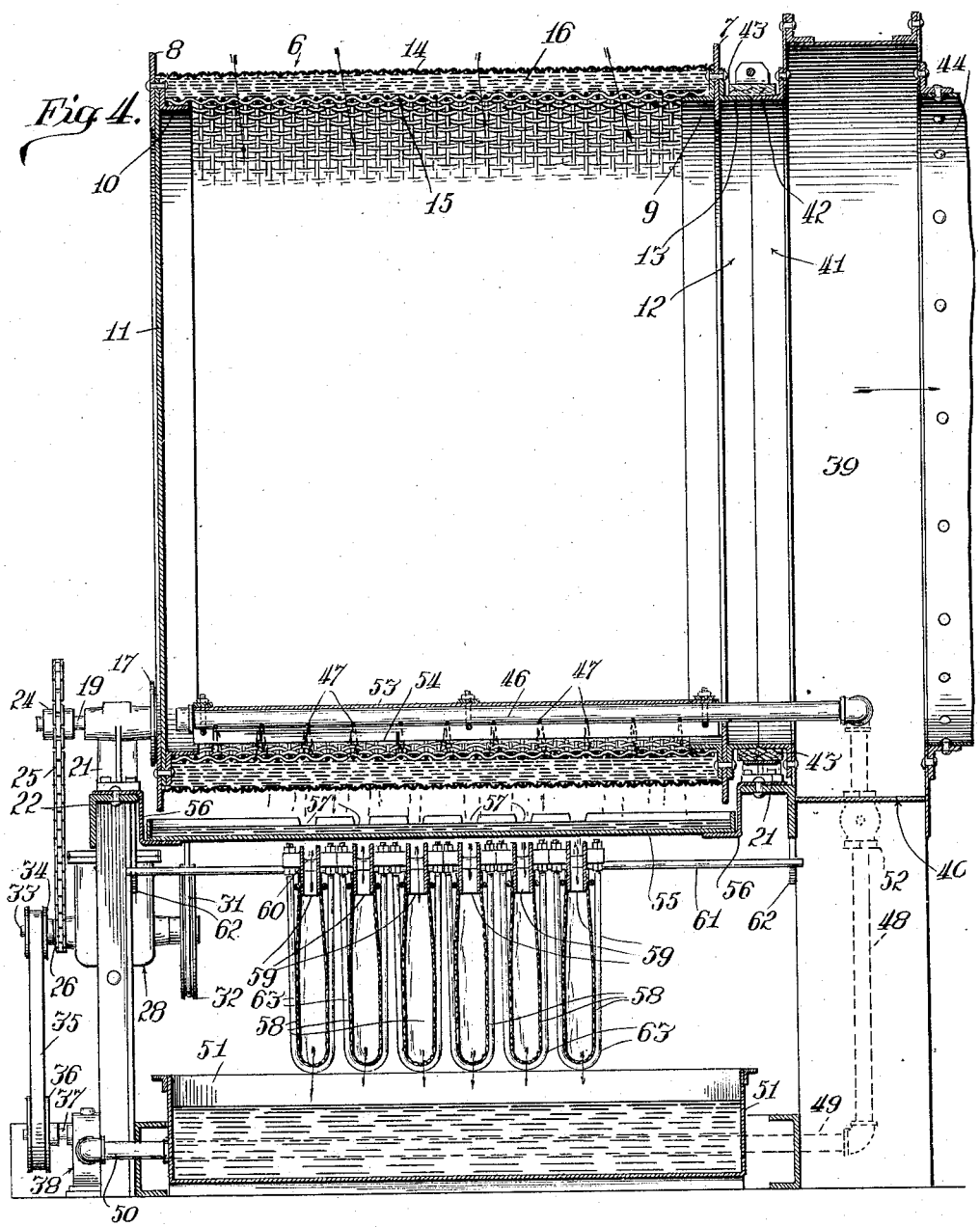

Feb. 18, 1930.   H. E. BIRKHOLZ   1,747,694
AIR FILTER
Filed March 30, 1925   3 Sheets-Sheet 3

Patented Feb. 18, 1930

1,747,694

UNITED STATES PATENT OFFICE

HANS E. BIRKHOLZ, OF CHICAGO, ILLINOIS, ASSIGNOR, BY MESNE ASSIGNMENTS, TO AMERICAN AIR FILTER COMPANY, INC., OF LOUISVILLE, KENTUCKY, A CORPORATION OF DELAWARE

AIR FILTER

Application filed March 30, 1925. Serial No. 19,405.

My invention relates to the purification of air by the removal therefrom of matter carried in suspension, by a process of filtration. In the larger cities especially, where the air is more or less contaminated by sooty particles, dust, etc., it is highly desirable that the public health be safeguarded by the removal of such particles from the air supplied to theatres, halls, and other places where people congregate in comparatively large numbers, and it has heretofore been proposed that this be accomplished by the use of filtering apparatus, but to meet the requirements of such situations satisfactorily it is necessary that the air purifying apparatus be so constructed as to operate continuously and automatically, so that it will require comparatively little attention and may always be relied upon to do efficient work. Where the air to be purified contains a comparatively large quantity of soot, or other solid matter, obviously, if passed through an air filter, the filtering material will soon become clogged so as to impede the flow of air and materially reduce the efficiency of the apparatus, if not put it out of commission altogether, unless means be provided for continuously maintaining the filtering material relatively clean by the removal of the separated impurities, and while several expedients have heretofore been devised for that purpose, so far as I am aware, prior to my invention no one has produced a reliable air filter in which the filtering material will automatically be maintained in a state to perform satisfactory work. To provide an air filtering apparatus that will meet all the requirements of purifying air in large volume, and will do the work economically, is the object of my present invention. This I accomplish as illustrated in the drawings and as hereinafter described. What I regard as new is set forth in the claims.

In the accompanying drawings, in which I have illustrated one way of practically applying my invention,—

Fig. 1 is a side elevation of an air filter embodying my improvements;

Fig. 2 is a partial end view of the right-hand end of the filter as shown in Fig. 1;

Fig. 3 is a detail, illustrating the nature of the filtering material that is preferably employed;

Fig. 4 is a central longitudinal vertical section; and

Figure 5:
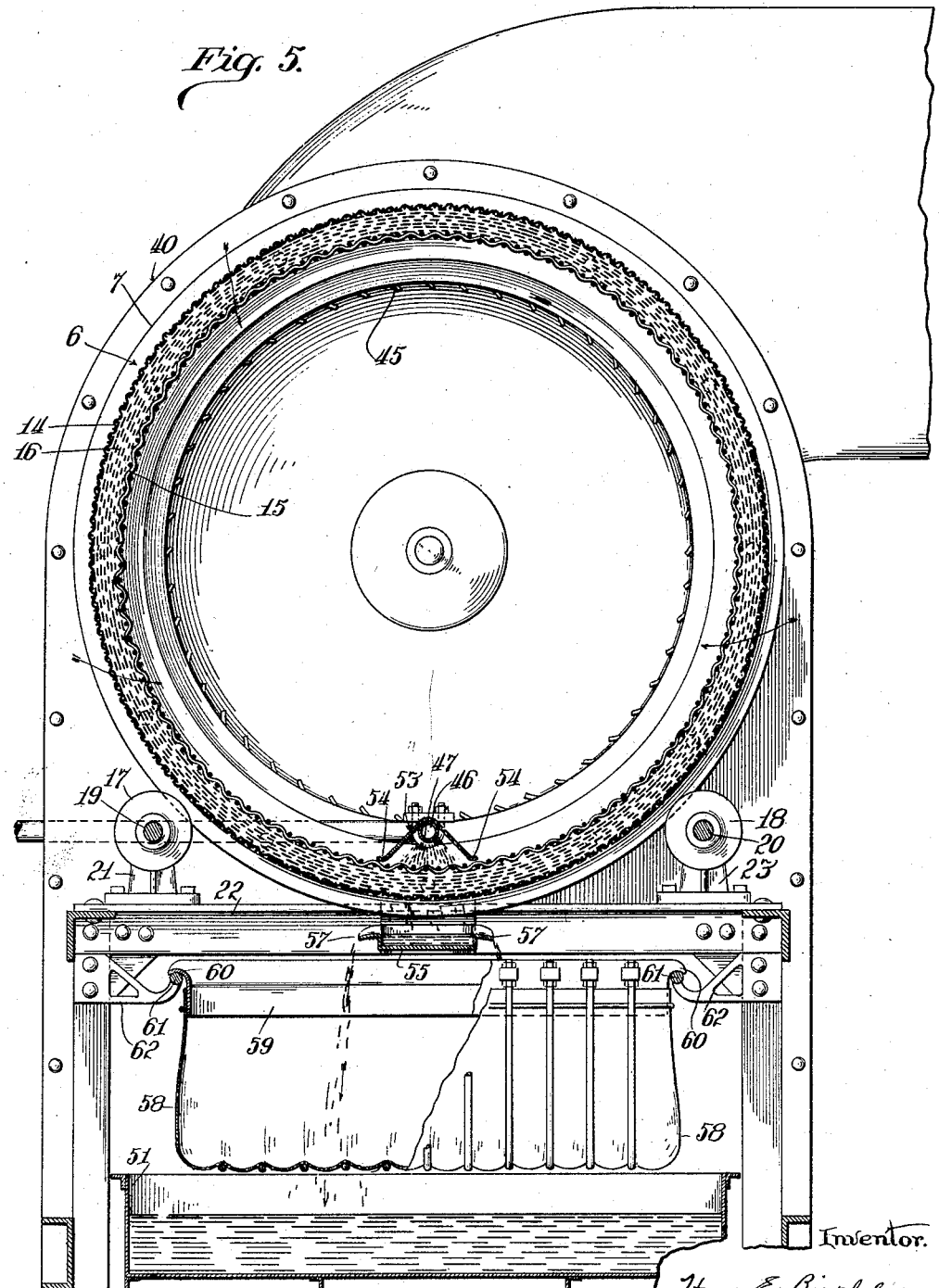
Fig. 5 is a transverse vertical section, with one of the oil filters partly in elevation.

My improved air filter comprises primarily a drum, a greater or less part of the peripheral portion of which constitutes a filtering zone formed of a mass of suitable filtering material pervious to air, and constantly kept coated with a viscous liquid, such as oil, adapted to entrain the solid particles carried in suspension by the air. The air is caused to flow inwardly through the filtering zone, and is withdrawn from the drum axially by suitable means, such as a suction fan. The filtering material would of course soon become clogged by the accumulation in it of the impurities removed from the air, unless it were constantly being cleaned by the removal therefrom of such impurities, and to this end the drum is continuously rotated at very slow speed, and at one point in its rotation the filtering material is subjected to the action of cleaning and conditioning means which not only removes the impurities, but restores the filtering material to an effective condition by applying to it a fresh supply of clean viscous liquid. This means consists of an apparatus for discharging clean viscous liquid outwardly through the filtering material along a narrow band extending transversely of the filtering zone. The drum is best arranged to rotate about a horizontal axis, and the cleansing and conditioning means is best located at the lowest point of the drum, so that the liquid is discharged therefrom in a downward direction, and after passing through the filtering material may be conveniently collected and cleansed, preferably by filtration, after which it may be used over again. By means of a suitable pump the viscous liquid may therefore be caused to circulate continuously, and by continuously rotating the drum the filtering material will always be kept in condition for efficient operation without attention from an operator, other than such casual attention as may be required in connection with the purification of the viscous liquid, which is needed only at long intervals.

Referring now to the drawings, in connection with which the embodiment of my invention shown therein will be more particularly described,—6 indicates generally the filter drum, which, as best shown in Figs. 1 and 4, comprises two end members 7, 8 in the form of annular plates secured respectively to angle iron end rings 9, 10. The ring 10 also carries an end plate 11 which closes the left-hand end of the drum as viewed in Fig. 4. The other end of the drum is left open axially, and an angle iron ring 12 is secured to the outer face of the member 7, with one of its flanges 13 extending horizontally outward from the member 7. The end members of the drum are connected by inner and outer cylindrical screens 14, 15, preferably of wire mesh, and of such diameters that space is provided between them for the reception of a mass of filtering material 16. This filtering material is preferably made up of meshed copper filament woven or knit so that it is flexible and may be gathered into a spongy mass, which, however, will be freely pervious to air. This filtering material is confined by the inner and outer screens, which preferably extend from end to end of the drum, although that is not essential. The peripheral portion of the drum therefore constitutes a zone of filtering material through which air may freely pass under the influence of suction, as hereinafter described.

In order that the drum may rotate freely, it is mounted on two pairs of rollers 17, 18 carried by shafts 19, 20, respectively, located at opposite sides of the axis of the drum, as best shown in Fig. 5. These rollers are provided with grooved peripheries, and they are so located as to register with the margins of the end members 7, 8 of the drum, which fit in said grooves, so that the drum is held against endwise displacement. The shaft 19 is mounted in standards 21 rising from one end portion of a base 22, and the shaft 20 is mounted in similar standards 23 rising from the other end portion of said base, as best shown in Fig. 5. The rollers 17 are non-rotatably secured to the shaft 19, which serves as a drive shaft for rotating the drum, but the rollers 18 need not be non-rotatably secured on the shaft 20, as they are idlers, and if desired instead of mounting the latter rollers on the same shaft they may be otherwise suitably supported.

Power is communicated to the shaft 19 for rotating the drum by means of a sprocket wheel 24 non-rotatably secured to said shaft, and connected by a link belt 25 with a sprocket wheel 26 mounted on a shaft 27 which extends into a housing 28 containing some suitable type of speed reducing gearing that is driven from an electric motor 29 by means of a belt 30. Said belt runs over a pulley on the armature shaft 31 of the motor, and over a larger pulley 32 mounted on a shaft 33 that extends into said housing and drives the speed reducing gearing. The purpose of this arrangement is to rotate the drum 6 at very slow speed, say one-half revolution per hour, although the speed of the drum may be greater or less, as preferred. The shaft 33 also carries a pulley 34 connected by a belt 35 with a pulley 36 which is mounted on the shaft 37 of a rotary pump 38, the function of which will be hereinafter described.

The open end of the drum 6 communicates with a chamber 39 formed by a stationary drum 40 arranged coaxially with the drum 6 and provided with an angle iron ring 41, the horizontal flange 42 of which registers with the horizontal flange 13 of the ring 12 carried by the rotary drum. These two flanges do not contact, although their end margins are in close proximity to each other, and around them is fitted a felt band 43 which forms an air seal at the juncture of said flanges, but does not interfere with the rotation of the drum 6. The stationary drum 40 connects at its opposite side with an outlet duct 44 leading to an exhaust or suction fan 45, driven in any suitable way, so as to draw air inwardly through the filtering zone of the drum 6 and deliver it to the place or places where it is to be used.

The filtering material would be comparatively ineffective for cleansing the air if it were not kept coated with a viscous liquid capable of entraining the solid particles suspended in air, and for the purpose of continuously maintaining the filtering material in an effective state, I provide not only for applying a suitable liquid, such as oil, to the filtering material, but also for constantly removing the oil that has accumulated impurities and replacing it with fresh oil. To this end I employ a suitable duct, such as a pipe 46, that extends longitudinally of the drum adjacent to the inner surface of the inner screen 14, and provided at intervals with perforations 47 arranged to discharge the contents of said pipe generally in a downward direction against the adjacent surface of said screen. These perforations are preferably staggered somewhat, so as to direct the discharge to some extent laterally along a comparatively narrow band that extends transversely of the filtering zone. One end of the pipe 46 is connected by a vertical pipe 48 and a horizontal pipe 49 with the oil pump 38, which in turn is connected by a pipe 50 with a reservoir or pan 51 adapted to contain oil, as best shown in Fig. 4. The arrangement is such that by the operation of the pump 38 oil is drawn from the reservoir 51 and supplied under pressure to the pipe 46, from which it is discharged downward against the filtering material, as above described. The pipe 48 is preferably provided with a valve 52, so that the flow of oil to the pipe 46 may be regulated. The oil discharged from the pipe 46 is confined laterally by a shield 53 which is carried by said pipe and is provided with downwardly diverging wings 54, the lower margins of which lie in proximity to the inner surface of the screen 14 and are spaced apart from each other a distance approximately equal to the width of the band over which the oil is applied. This shield serves the purpose of confining the oil to the area to which it is desired to apply it, and also relieves the corresponding part of the filtering zone from the influence of the suction fan so that air does not flow inward through the filtering material at that point, and therefore does not interefere with the efficiency of the cleansing operation.

The oil discharged from the pipe 46 passes downward through the filtering material with sufficient force to dislodge the foul oil adhering thereto, and to recoat it with fresh oil, and this operation continuously takes place as the drum rotates, so that every part of the filtering zone is cleansed and reconditioned in the course of each revolution of the drum.

The impure oil drops from the outer screen 15 into a trough or pan 55 placed to receive it, said trough being supported by angle iron brackets 56 carried by the base 22, as shown in Fig. 4. Said trough is provided at its opposite side margins with laterally projecting lips 57 by which the overflow is directed into a series of filter bags 58 of a fabric adapted to serve as an oil filter. As shown in Figs. 4 and 5 these bags are long and narrow, and each of them is provided at its open upper end with a metal frame 59, the end portions of which are curved to form lips 60, as best shown in Fig. 5. These lips are adapted to hook over rods 61 carried by brackets 62 secured at the opposite ends of the base, so that they serve to removably suspend the bags over the reservoir 51. A sufficient number of filter bags 58 are provided so that one may be placed under each pair of lips 57 to receive the oil discharged thereby.

Said bags are preferably supported intermediately by a series of bails 63, the upper ends of which are attached to the frames 59, as shown in Fig. 4.

From the foregoing description it will be understood that the impure oil coming from that part of the filtering material that is being cleansed, is directed into the filter bags 58, and after percolating therethrough is deposited in the reservoir 51, from which it is withdrawn and restored to circulation by the pump 38. This filtration of the oil cleanses it so that it is fit for reuse. After the filter bags have been used for some time, they become more or less clogged and must themselves be cleansed, which may be easily accomplished by withdrawing the frames 59, with the bags attached, from the rods 61, after which the soiled bags may be detached from said frames and washed in any suitable way to fit them to be used again, clean bags being in the meantime substituted for those removed. If percolation through the filter bags is retarded to such an extent that they become filled with oil, the overflow is discharged over the lips 60 into the reservoir 51 and passes into circulation, so that even though the matter of maintaining the filter bags in proper condition be neglected, the apparatus will continue to operate, although the oil in circulation may be less clean than is desirable; but with reasonable attention to the matter of keeping the filter bags 58 in proper condition for use, the oil supplied to the pipe 46 will be comparatively clean and in suitable condition to obtain satisfactory results.

As at long intervals it may be desired to blow out the oil pipe and cleanse the filtering material by the use of steam or hot water, I provide a removable plug 64 at some convenient point, as at the juncture of the pipes 46 and 48 (see Fig. 2), so that a steam or hot water connection may be made at that point.

The use of a metallic filtering material to form the filtering zone of a rotating drum filter, in connection with means for progressively removing the accumulated impurities and reconditioning the filtering material, is important, because the nature of the filtering material prevents the oil and the impurities from soaking into it, or adhering to it so firmly as to interfere with its being cleansed properly, and, moreover, the interstices between the filaments composing the filter bed may be made fine enough so that the impurities carried by the air will be intercepted and entrained by the oil coating, without, however, interfering materially with the flow of air therethrough, which is not the case where the filtering material is apt to mat closely. The application of the cleansing liquid along a comparatively narrow band that extends transversely of the filtering zone is also a valuable feature of my invention, since the washing operation is not interfered with by the air flow through the filtering material, and the filter bed is reconditioned by the application of fresh oil thereto without the disturbance that would be occasioned by reverse flow of air through the filtering material at that time. I prefer to locate the oil distributing pipe 53 below the axis of the drum and substantially in the longitudinal vertical plane of such axis, but my invention is not limited to that precise arrangement. Said pipe should, however, be located in the lower portion of the drum and as near to the lowest point thereof as is practicable. Furthermore, while I prefer to rotate the drum by the frictional engagement of the rollers 17 therewith, it may be driven by gearing arranged in substantially the same way, and if desired both pairs of rollers may be driven, although ordinarily the application of power to only one pair of rollers will suffice.

What I claim as my invention and desire to secure by Letters Patent, is—

1. An air filter comprising a rotatable drum closed at one end and having an outlet for air at the opposite end, its cylindrical surface being formed of a screen-like structure carrying a spongy metallic mass through which the air may pass from the outside of the drum inwardly toward the outlet of the drum, means for slowly rotating the drum, a reservoir for oil located below the drum, an oil discharge conduit within the drum above said reservoir and arranged to discharge oil over the lower inner surface of the drum from end to end thereof, so that the oil from said conduit passes through the filtering material oppositely to the direction of flow of air through said filtering material, and a pump for continuously pumping the oil from said reservoir to said discharge conduit.

2. An air filter comprising a rotatable drum closed at one end and having an outlet for air at the opposite end, its cylindrical surface being formed of a screen-like structure carrying a spongy metallic mass through which the air may pass from the outside of the drum inwardly toward the outlet of the drum, means for slowly rotating the drum, a reservoir for oil located below the drum, an oil discharge conduit within the drum above said reservoir and arranged to discharge oil over the lower inner surface of the drum from end to end thereof, so that the oil from said conduit passes through the filtering material oppositely to the direction of flow of air through said filtering material, a pump for continuously pumping the oil from said reservoir to said discharge conduit, and means associated with the discharge conduit for confining a flow of oil onto the filtering material along a narrow band thereof.

3. An air filter comprising a rotatable drum closed at one end and having an outlet for air at the opposite end, its cylindrical surface being formed of a screen-like structure carrying a spongy metallic mass through which the air may pass from the outside of the drum inwardly toward the outlet of the drum, means for slowly rotating the drum, a reservoir for oil located below the drum, an oil discharge conduit within the drum above said reservoir and arranged to discharge oil over the lower inner surface of the drum from end to end thereof, so that the oil from said conduit passes through the filtering material oppositely to the direction of flow of air through said filtering material, a pump for continuously pumping the oil from said reservoir to said discharge conduit, and means between said drum and the reservoir for cleansing the oil on its way to the reservoir, comprising a settling pan having overflow outlets above the bottom of the pan.

4. An air filter comprising a rotatable drum closed at one end and having an outlet for air at the opposite end, its cylindrical surface being formed of a screen-like structure carrying a spongy metallic mass through which the air may pass from the outside of the drum inwardly toward the outlet of the drum, means for slowly rotating the drum, a reservoir for oil located below the drum, an oil discharge conduit within the drum above said reservoir and arranged to discharge oil over the lower inner surface of the drum from end to end thereof, so that the oil from said conduit passes through the filtering material oppositely to the direction of flow of air through said filtering material, a pump for continuously pumping the oil from said reservoir to said discharge conduit, means between said drum and the reservoir for cleansing the oil on its way to the reservoir, comprising a settling pan having overflow outlets above the bottom of the pan, and oil filtering means between said pan and said reservoir.

5. An air filter comprising a rotatable drum having an outlet for air at one end thereof, its cylindrical surface being formed of a screen-like structure carrying a spongy metallic mass through which air may pass from the outside of the drum inwardly toward the outlet of the drum, means for causing air to flow inwardly through the cylindrical surface of the drum, means for slowly rotating said drum, an oil discharge conduit located on the inside of said cylindrical surface and arranged to discharge oil over the surface of the drum from end to end thereof so that the oil from said conduit passes through the filtering material oppositely to the direction of flow of air through said filtering material, and means for supplying oil to said discharge conduit.

6. An air filter comprising a rotatable drum having a passageway for air communicating with the interior of said drum at one end thereof, said drum having its surface formed of a filtering material through which air may pass, means for rotating said drum, an oil discharge conduit located adjacent to and on the side of said drum surface opposite to the air entering side, means for supplying oil to said conduit, said conduit being arranged to discharge oil over the surface of the drum from end to end thereof so that the oil passes through the filtering material oppositely to the direction of flow of air through said filtering material for washing the dirt therefrom, and means located adjacent to said conduit on the opposite side of the drum surface for receiving the oil discharged through said filtering material.

7. An air filter comprising a supporting frame, a drum rotatably mounted on said frame, a zone of filtering media supported on the peripheral surface of said drum, means for inducing a flow of air through said zone of filtering media in one direction, a spray pipe mounted on said frame and located closely adjacent to the air discharge side of said zone of filtering media for spraying a fluid through said media in a direction opposite to the direction of flow of air therethrough, and a trough mounted on said frame and located in registry with said spray pipe and closely adjacent to the side of said filtering media opposite to the side where said pipe is located for receiving the fluid discharged by said spray pipe.

8. An air filter comprising a frame, a hollow member rotatably mounted thereon and having a portion of its walls made up of pervious filtering media, means for effecting a flow of air through said media, fluid discharging means positioned to project a fluid against a surface of said media and in a direction opposed to the flow of air therethrough, and a receptacle arranged to receive the fluid which passes through said media.

HANS E. BIRKHOLZ.